United States Patent Office 3,661,929
Patented May 9, 1972

3,661,929
DIIODOMETHYLATE 1,2 - BIS(4'-PYRROLYDINO-METHYL-1',3'-DIOXOLANYL-2') ETHANE
Solomon Aronovich Giller, Ulitsa Pernavas 101, kv. 76; Georgy Petrovich Sokolov, Ulitsa Avotu 28, kv. 3; and Agris Adolfovich Kimenis, Ulitsa Revoljutsii 10, kv. 30/31, all of Riga, U.S.S.R.; and Via Ekabovna Klusha, St. Maiory, ulitsa Dauku 11, Jurmala, Latviiskoi, U.S.S.R.
No Drawing. Filed May 7, 1969, Ser. No. 822,698
Claims priority, application U.S.S.R., May 12, 1968, 1,239,904
Int. Cl. C07d 27/02
U.S. Cl. 260—326.5 D          1 Claim

ABSTRACT OF THE DISCLOSURE

The diiodomethylate of 1,2-bis-(4'-pyrrolydinomethyl-1',3'-dioxolanyl-2') ethane of the following formula

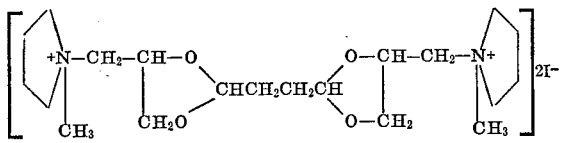

is used as the active ingredient in a pharmaceutical composition of curare-like action.

The process for the preparation of the above product consists in reacting 1,2-bis(4'-chloromethyl-1',3'-dioxolanyl-2') ethane with pyrrolydine at a temperature not higher than 150° C. and a subsequent liberation of the obtained base—1,2-bis(4'-pyrrolydinomethyl-1',3'-dioxolanyl-2') ethane; treatment of the latter with methyl iodide in an organic solvent resulting in formation of the final product.

---

The present invention relates the a new compound—diiodomethylate of 1,2-bis(4'-pyrrolydinomethyl-1,3'-dioxolanyl-2')ethane, a method for its preparation and its application.

According to the invention, the diiodomethylate of 1,2-bis(4'-pyrrolydinomethyl-1',3'-dioxolanyl - 2'-)ethane has the following formula

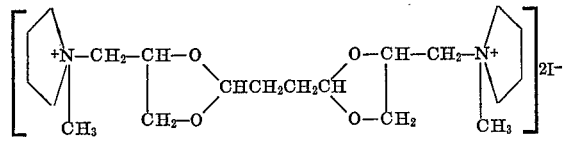

The indicated compound is a fine-crystalline powder of a light-yellow color, readily soluble in water, in alcohol by heating, sparingly soluble in acetone, chloroform and ether; M.P. 167–172° C.

According to the invention the diiodomethylate of 1,2-bis(4'-pyrrolydinomethyl-1',3'-dioxolanyl-2')ethane is obtained by reacting 1,2-bis(4'-chloromethyl-1',3'-dioxolanyl-2')ethane with pyrrolydine at a temperature not higher than 150° C., subsequently liberating the obtained base 1,2-bis(4'-pyrrolydinomethyl-1',3'-dioxolanyl - 2')-ethane, treating of the latter with methyl iodide in an organic solvent to form the end product.

It is preferable, in order to obtain maximal yields, to use the initial components—1,2-bis(4'-chloromethyl-1',3'-dioxolanyl-2')ethane and pyrrolydine—in a molar ratio of 1:4. It is advisable to employ as organic solvent acetone or ethyl alcohol.

The proposed method of preparation is carried out as follows.

The initial components—1,2-bis(4'-chloromethyl-1',3'-dioxolanyl-2')ethane and pyrrolydine are made to react at a temperature not higher than 150° C. for 5–6 hours. It is preferable to use the initial components in the molar ratio 1:4. During the indicated process an exchange of chlorine atoms of the chloromethyl groups for pyrrolydine takes place and 1,2-bis(4'-pyrrolydinomethyl-1',3'-dioxolanyl-2')ethane and pyrrolydine hydrochloride are formed. After separation of the latter and in order to purify the base—1,2-bis(4'-pyrrolydinomethyl-1',3'-dioxolanyl - 2')-ethane is vaccum distilled. The thus obtained purified base is dissolved in an organic solvent such as acetone, ethyl alcohol, carbon tetrachloride, ethyl acetate etc. The obtained solution is treated with methyl iodide and the final product is obtained in crystalline state. Yield—45–75%.

We have found the the diiodomethylate of—1,2-bis(4'-pyrrolydinomethyl-1',3'-dioxolanyl-2')ethane is a pharmacologically active substance with curare-like action and it is now proposed as an active ingredient for pharmaceutical preparations of curare-like effect.

According to the invention, the composition contains an active ingredient—the diiodomethylate of 1,2-bis(4'-pyrrolydinomethyl-1',3'-dioxolanyl-2')ethane combined with a pharmaceutical solvent.

The medical preparation contain 0.1% mass concentration of the active ingredient.

The pharmaceutical composition, under a provisional name "Dioxonine," is a muscle relaxant of antidepolarizational type of action. Dioxonine has a number of advantages as compared with already known therapeutical preparations of curare-like action, such as D-tubocurarin, succinylcholine, decametonium etc. Unlike D-tubocurarin, Dioxonine does not reduce arterial pressure or influence coronary function of the patients. The main disadvantage of decametonium is the lack of an effective antagonist (the well-known antagonist of curare-like preparations—proserin or neostigmin—increases its action). The use of succinylcholine brings about adverse reactions such as post-surgical muscle pains due to fibrillation of skeletal muscles, caused by the use of this preparation, prolonged apnoea, bradycardia and coronary arhythmia. The preparation Dioxonine is more effective and remains free of such side reactions.

Dioxonine has a well expressed selective influence on n-choline-reactive systems of the nervo-muscular synapses of skeletal muscles.

The preparation was clinically tried on 230 patients. It was applied as the main muscle relaxant at anaesthesia during surgical interventions, as well as for therapeutical and diagnostic purposes. The duration of narcosis was from 10 minutes to 6 hours.

In order to produce a full relaxation of the skeletal muscles a high dose of 2–5 mg. of the preparation was used (2–5 ml. of 0.1% solution). Full relaxation ready for intubation set in during 2–3 minutes after the preparation was administered intravenously in the dosage indicated above. Dioxonine does not cause any muscle fibrillation. The action of the indicated dose of the preparation continues for 20–120 minutes (before the start of the first signs of independent breathing and the appearing of the cornea reflex) depending upon the intensity of the narcosis and the used initial dose of the preparation.

Clinical observations did not show any influence of Dioxonine on the dynamics of the arterial pressure, on pulse rate and on the character of the ECG and the electroencephalogram (EEG). Blood analysis made right after the end of the operation did not show any substantial deviations from the initial data obtained before surgery.

Dioxonine has a certain cumulative effect which may be caused by repeated administration of the preparation.

In case of the necessity to neutralize the action of Dioxonine the usual anticholinesterase substances are used, such, as for instance, proserin.

The preparation is administered parenterally as a 0.1% aqueous solution.

Dioxonine solution remains stable at sterilization and during one year storage.

The preparation Dioxonine has no side effects; there are no contraindications for its use.

In order that the preparation of diiodomethylate 1,2-bis(4' - pyrrolydinomethyl - 1',3' - dioxolanyl - 2')ethane may be well understood the following examples are given:

EXAMPLE 1

281.8 g. (1.04 moles) of 1,2 - bis(4' - chloromethyl-1',3' - dioxolanyl - 2')ethane and 296.5 g. (4.21 moles) of pyrrolydine are heated 6 hours gradually rising the temperature up to 150° C. After cooling 1000 ml. of thyl acetate are added and the precipitated salt filtered. The solvent is distilled off from the filtrate under the pressure and the rest is vacuum distilled under 1–2 mm. pressure. The fraction boiling in the interval between 190–210°, $n_D^{20}$ 1.490 is collected. Yield—292 g. (83%) of 1,2 - bis(4' - pyrrolydinomethyl - 1',3' - dioxolanyl-2')ethane.

$C_{18}H_{32}N_2O_2$.—Calculated (percent): C, 63.49; H, 9.47; N, 8.23. Found (percent): C, 63.40; H, 9.25; N, 8.28.

The obtained base is dissolved in 1700 ml. of acetone and while stirring and cooling the solution 516 g. (3.62 moles) of methyl iodide are gradually added. The precipitated oil, without separating it from acetone, is ground until crystallized and the mixture is heated by a reflux condenser in a water bath during 2 hours. The crystals are then filtered off and filter washed with acetone. Yield of diiodomethylate 1,2 - bis(4' - pyrrolydinomethyl-1',3'-dioxolanyl - 2')ethane. 405 g. (75%): M.P. 165–172°.

$C_{20}H_{38}\tau_2N_2O_4$.—Calculated (percent): C, 38.47; H, 6.14; N, 4.53; $\tau$, 40.65. Found (percent): C, 38.27; H, 6.31; N, 4.42; $\tau$, 40.35.

EXAMPLE 2

The reaction of 1,2 - bis(4' - chloromethyl - 1',3'-dioxolanyl - 2')ethane with pyrrolydine is carried out according to Example 1.

The obtained base 1,2 - bis(4' - pyrrolydinomethyl-1',3' - dioxolanyl - 2')ethane is dissolved in 500 ml. of absolute ethyl alcohol and while stirring and cooling 516 g. (3.62 moles) of methyl iodide are added. The precipitated oil, without separating it from the solvent, is ground until crystallized and the mixture heated up to boiling for 30 min. The crystals are then filtered off and filter washed with acetone.

Yield of diiodomethylate 1,2 - bis(4' - pyrrolydinomethyl - 1',3' - dioxolanyl - 2')ethane—243 g. (45%); M.P. 165–172°.

$C_{20}H_{38}\tau_2N_2O_4$.—Calculated (percent): C, 38.47; H, 6.14; N, 4.53; $\tau$, 40.65. Found (percent): C, 38.35; H, 6.21; N, 4.45; $\tau$, 40.37.

What we claim is:

1. The diiodomethylate of 1,2 - bis(4' - pyrrolydinomethyl - 1',3' - dioxolanyl - 2')ethane having the formula

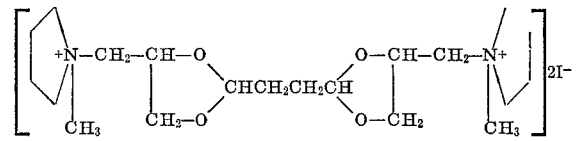

References Cited

Morrison et al.: Organic Chemistry (1959), pp. 526–27.

ALEX MAZEL, Primary Examiner

J. A. NARCAVAGE, Assistant Examiner

U.S. Cl. X.R.

260—340.9; 424—274